United States Patent [19]

Lisowyj

[11] Patent Number: 4,567,026
[45] Date of Patent: Jan. 28, 1986

[54] METHOD FOR EXTRACTION OF IRON, ALUMINUM AND TITANIUM FROM COAL ASH

[75] Inventor: Bohdan Lisowyj, Omaha, Nebr.

[73] Assignee: InterNorth, Inc., Omaha, Nebr.

[21] Appl. No.: 664,359

[22] Filed: Oct. 24, 1984

[51] Int. Cl.[4] .................... C01G 23/04; C01G 49/02; C01F 7/02
[52] U.S. Cl. ........................................ 423/81; 423/82; 423/85; 423/127; 423/132; 423/140; 423/150
[58] Field of Search .................. 423/111, 127, 132, 85, 423/81, 82, 140, 150

[56] References Cited

U.S. PATENT DOCUMENTS

| | | |
|---|---|---|
| 2,089,180 | 8/1937 | Bousquet et al. |
| 2,612,262 | 9/1952 | Symington et al. |
| 2,816,657 | 12/1957 | Austin et al. |
| 2,830,892 | 4/1958 | Udy ............................................ 75/30 |
| 3,983,212 | 9/1976 | Lowenstein et al. ................. 423/111 |
| 4,031,182 | 6/1977 | Loest ..................................... 423/127 |
| 4,069,296 | 1/1978 | Huang ................................... 423/127 |
| 4,191,336 | 3/1980 | Brown ..................................... 241/21 |
| 4,243,640 | 1/1981 | Hill et al. ............................. 423/111 |
| 4,252,777 | 2/1981 | McDowell et al. ................. 423/111 |
| 4,256,709 | 3/1981 | Sizyakov et al. ................... 423/127 |
| 4,362,703 | 12/1982 | Boybay et al. ..................... 423/111 |
| 4,386,057 | 5/1983 | Dobbins et al. .................... 423/111 |

OTHER PUBLICATIONS

De Carlo et al., "Oak Ridge National Lab., #ORNL/TM-6126", Oak Ridge Lab., Oak Ridge TN, 1978, pp. 33-39 cited.

Primary Examiner—H. T. Carter
Attorney, Agent, or Firm—Donald F. Haas

[57] ABSTRACT

A method is disclosed for the recovery of iron, aluminum and titanium from coal ash. The method comprises magnetically extracting magnetite from the ash, leaching the ash with a solution of a mineral acid, precipitating and removing titanium and iron hydroxides from the leach solution by adding thereto a solution of a strong base, and precipitating and removing aluminum hydroxide by contacting the remaining solution with carbon dioxide or aluminum hydroxide seeding.

2 Claims, 1 Drawing Figure

METHOD FOR EXTRACTION OF IRON ALUMINUM AND TITANIUM FROM COAL ASH

BACKGROUND OF THE INVENTION

Large quantities of fly or coal ash carried by the combustion products of power plants burning pulverized coal exist throughout the country and more is being created by the operation of these plants. This accumulation creates a disposal problem and represents a waste of metal values as coal ash can contain from 7.1 to 14.3% aluminum, 2.7 to 29.0% iron, and 0.28 to 0.83% titanium by weight. Lesser amounts of other useful metals are present in coal ash.

There are existing processes for recovering some of these metals from fly ash but none are capable of recovering all of these metals. There is a need for a relatively safe and inexpensive method for separating metals from coal ash. It is an object of the present invention to provide such a method.

SUMMARY OF THE INVENTION

The present invention relates to a method for the recovery of the iron, aluminum and titanium from coal ash. The method comprises first magnetically extracting magnetite ($Fe_3O_4$) from the ash. Next, the ash is leached with a solution of a mineral acid. This solution is then treated with a strong base to precipitate and remove titanium and iron hydroxides from the leach solution and to keep aluminum in solution. Finally, aluminum hydride is precipitated and removed.

DETAILED DESCRIPTION OF THE INVENTION

Figure 1:
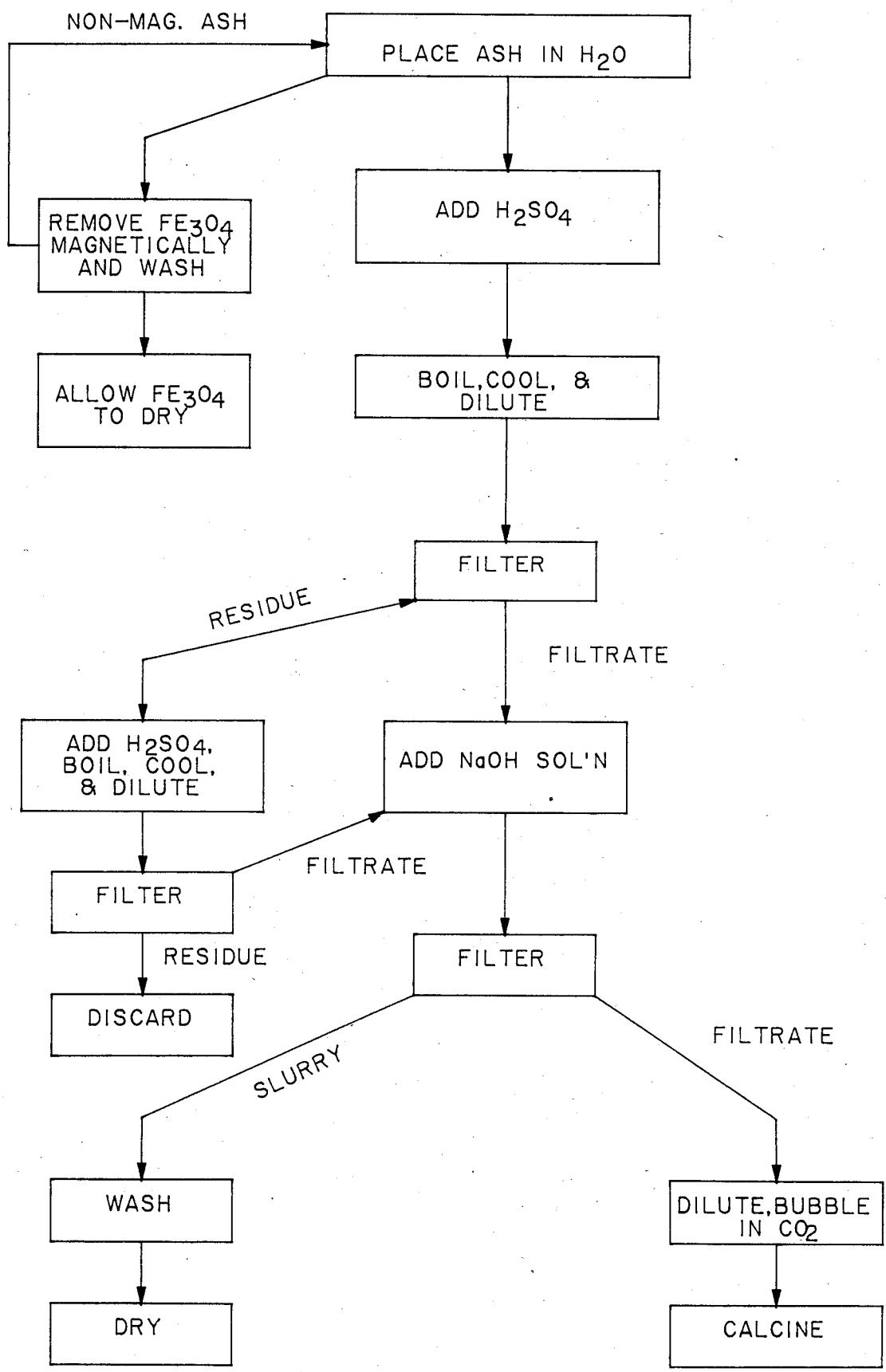
FIG. 1 is a flow diagram which illustrates a preferred embodiment of the present invention.

Magnetite ($Fe_3O_4$) can be extracted from the coal ash by any convenient magnetic method. Two preferred apparatuses for magnetically extracting the magnetite are disclosed in my copending applications entitled Electromagnetic Separator, Ser. No. 664,361, now abandoned, and Centrifugal $Fe_3O_4$ Separator, Ser. No. 664,360, filed concurrently herewith. The coal ash may be extracted in the dry state or it may be first placed in a non-reactive (with the ash) solvent such as distilled water, alcohol, or acetone where the magnetic extraction takes place.

The next step in the process is to leach the coal ash. It is preferred that the leaching takes place in a solution of a mineral acid, e.g. sulfuric, hydrochloric, or nitric. Sulfuric acid is preferred because of its availability and because it readily leaches the three metals out of the coal ash. The acid solution is preferably heated to boiling, cooled, diluted, and filtered. Siliceous and calcium oxides are present in the residue which is discarded.

The filtrate or liquid portion of the leaching solution is then treated with a strong base, e.g. sodium, potassium, or ammonium hydroxide. Sodium hydroxide is preferred because of its availability and because it readily forms an aluminate which can be transformed into a hydroxide. Treatment with a base causes the formation of and precipitation out of titanium hydroxide and the hydroxide of any unremoved iron. The solution is filtered to separate the hydroxides from the filtrate and the hydroxide are washed and dried.

Finally, the filtrate is treated with carbon dioxide, a weak mineral acid or seeded with aluminum hydroxide to form aluminum hydroxide which is removed by precipitation from the solution. The contact with carbon dioxide is preferably carried out by bubbling carbon dioxide gas through the liquid. The precipitated aluminum hydroxide is calcined to produce aluminum oxide.

EXAMPLE

FIG. 1 is a flow diagram which illustrates the use of the invention disclosed herein. First, coal ash is placed in a solution of distilled water. The magnetite is then removed magnetically, washed, and dried. The non-magnetic ash is recycled back to the ash water solution. This solution is then treated with an 18N solution of sulfuric acid in water, heated to close to boiling at about 110° C., cooled and diluted with distilled water. The siliceous and calcium oxides which precipitate out are filtered and discarded.

The filtrate from the sulfuric acid leach solution is treated with a 50% solution of sodium hydroxide in water. This causes the precipitation of hydroxides of titanium and any unremoved iron. These hydroxides are filtered, washed, and dried.

The filtrate from the sodium hydroxide treatment is then treated with carbon dioxide by bubbling said gas through the liquid for 10 minutes at a rate of about 5 liters per hour. Aluminum hydroxide precipitates out. This aluminum hydroxide is calcined at a temperature of about 500° C. to produce aluminum oxide.

I claim:

1. A method for the recovery of iron, aluminum, and titanium from coal ash which comprises:
   (a) magnetically extracting magnetite from the ash,
   (b) leaching the ash with a solution of a mineral acid selected from the group consisting of sulfuric, hydrochloric, and nitric acids,
   (c) precipitating and removing titanium and iron hydroxides from the leach solution by adding thereto a solution of a strong base selected from the group consisting of sodium, potassium, and ammonium hydroxides,
   (d) precipitating aluminum hydroxide by contacting the remaining solution from step (c) with a precipitation agent selected from the group consisting of carbon dioxide, a weak mineral acid, and aluminum hydroxide seed, and
   (e) removing the aluminum hydroxide.

2. The method of claim 1 wherein the coal ash is placed in a non-reactive solvent before said magnetic extraction.

* * * * *